(12) United States Patent
Nie

(10) Patent No.: US 11,190,285 B1
(45) Date of Patent: Nov. 30, 2021

(54) TRANSMITTER, RECEIVER, SIGNAL TRANSCEIVER AND METHODS THEREFOR

(71) Applicant: Hangzhou Geo-chip Technology Co., Ltd., Hangzhou (CN)

(72) Inventor: Hong Nie, St. Paul, MN (US)

(73) Assignee: HANGZHOU GEO-CHIP TECHNOLOGY CO., LTD.

( * ) Notice: Subject to any disclaimer, the term of this patent is extended or adjusted under 35 U.S.C. 154(b) by 0 days.

(21) Appl. No.: 17/092,476

(22) Filed: Nov. 9, 2020

(51) Int. Cl.
| | | |
|---|---|---|
| *H04L 5/12* | (2006.01) | |
| *H04B 3/46* | (2015.01) | |
| *H04B 17/21* | (2015.01) | |
| *H04B 17/10* | (2015.01) | |
| *H04B 17/24* | (2015.01) | |
| *H04B 17/26* | (2015.01) | |

(52) U.S. Cl.
CPC ........... *H04B 17/21* (2015.01); *H04B 17/102* (2015.01); *H04B 17/24* (2015.01); *H04B 17/26* (2015.01)

(58) Field of Classification Search
CPC ...... H04B 17/21; H04B 17/102; H04B 17/24; H04B 17/26
USPC .................................................. 375/224, 262
See application file for complete search history.

(56) References Cited

U.S. PATENT DOCUMENTS

| | | | | |
|---|---|---|---|---|
| 8,064,863 | B1* | 11/2011 | Reed ................. | H04B 1/30 455/285 |
| 10,422,910 | B2* | 9/2019 | Willis .................. | E21B 28/00 |
| 2004/0198340 | A1* | 10/2004 | Lee .................... | H04B 17/21 455/423 |
| 2015/0350000 | A1* | 12/2015 | Chang ................ | H04L 27/364 375/227 |

* cited by examiner

*Primary Examiner* — Don N Vo
(74) *Attorney, Agent, or Firm* — McDonnell Boehnen Hulbert & Berghoff LLP

(57) ABSTRACT

Disclosed is a receiver (200) comprising a signal receiving module (201) configured to receive a first test signal and receive a second test signal after a predefined time period following the completion of the reception of the first test signal, and a calculating module (202) configured to calculate a calibration parameter for calibrating a received RF communication signal, based on the received first test signal and the received second test signal. Correspondingly, a transmitter, a signal transceiver, a signal receiving method, and a signal transmitting method are disclosed.

11 Claims, 3 Drawing Sheets

TRANSMITTER, RECEIVER, SIGNAL TRANSCEIVER AND METHODS THEREFOR

TECHNICAL FIELD

The present disclosure relates to the field of signal processing technology, and particularly to a transmitter, a receiver, a signal transceiver and methods therefor.

BACKGROUND

In order to eliminate a mirror interference signal generated by the mismatch between an I mixer and a Q mixer at a Radio Frequency (RF) receiver, an RF transmitter is required to send a test signal to the RF receiver, so that the RF receiver can estimate calibration parameters and then calibrate RF communication signals based on the estimated calibration parameters. Herein, the RF communication signal refers to an RF signal that is used to carry actual communication information and received by the RF receiver after the calibration based on the test signal.

However, a residual error always exists in the RF transmitter and may generate an interference signal that would be contained in the test signal. In the prior art, adverse effects caused by the interference signal contained in the test signal cannot be effectively eliminated, as a result, the accuracy of estimating the mismatched parameters related to the mismatch between the I mixer and the Q mixer at the RF receiver is significantly decreased, and thus the mirror interference signal generated by the mismatch between the I mixer and the Q mixer cannot be eliminated from the RF communication signal with high precision.

SUMMARY

To address the problems in the prior art, embodiments of the present invention provide a signal transceiver and signal receiving and transmitting method, which can effectively eliminate a mirror interference signal caused by the mismatch between the I mixer and the Q mixer of the RF receiver.

An aspect of the present invention provides a receiver including: a signal receiving module configured to receive a first test signal, and receive a second test signal after a predefined time period following the completion of the reception of the first test signal; and a calculating module configured to calculate a calibration parameter for calibrating a received RF communication signal, based on the received first test signal and the received second test signal.

The calculating module may be further configured to: square and then average the received first test signal to obtain a first average value, and square and then average the received second test signal to obtain a second average value; obtain a real part of the received first test signal multiplied by 2 as a first real part, obtain a real part of the received second test signal multiplied by 2 as a second real part, square and then average the first real part to obtain a third average value, and square and then average the second real part to obtain a fourth average value; divide the sum of the first and second average values by the sum of the third and fourth average values to obtain an intermediate parameter; and calculate the calibration parameter based on formula below:

$$\frac{\beta}{\alpha^*} = \frac{\alpha\beta}{0.5 - \text{Re}(\alpha\beta) + \sqrt{0.25 - \text{Re}(\alpha\beta) - \text{Im}^2(\alpha\beta)}}$$

where $\beta/\alpha^*$ represents the calibration parameter, and $\alpha\beta$ represents the intermediate parameter.

The calculating module may be further configured to: remove DC components of the received first and second test signals before obtaining the first and second average values, and remove the DC components of the received first and second test signals, before obtaining the first and second real parts and then obtaining the third and fourth average values.

The receiver may further include a calibrating module configured to calibrate the RF communication signal received by the receiver based on the calibration parameter, to obtain the calibrated RF communication signal.

The calibrating module may be further configured to remove from the RF communication signal the calibration parameter multiplied by the conjugation of the RF communication signal, to obtain the calibrated RF communication signal.

The received first test signal and the received second test signal may differ from each other by a phase difference, which is preferably 90°.

Another aspect of the present invention provides a transmitter, which includes a signal transmitting module configured to transmit a first test signal and then transmit a second test signal after a predefined time period following the completion of the transmission of the first test signal.

A further aspect of the present invention provides a signal transceiver including a receiver of an embodiment of the invention and a transmitter of an embodiment of the invention, where the receiver and the transmitter are connected via a switch, and when the switch is closed, a first test signal transmitted from the transmitter is received by the receiver as the received first test signal, and a second test signal transmitted from the transmitter is received by the receiver as the received second test signal.

A further aspect of the present invention provides a signal receiving method including: receiving, by a receiver, a first test signal, and receiving a second test signal after a predefined time period following the completion of the reception of the first test signal; and calculating a calibration parameter for calibrating a received RF communication signal, based on the received first test signal and the received second test signal.

Preferably, the calculating a calibration parameter for calibrating a received RF communication signal based on the received first test signal and the received second test signal may include: squaring and then averaging the received first test signal to obtain a first average value, and squaring and then averaging the received second test signal to obtain a second average value; obtaining a real part of the received first test signal multiplied by 2 as a first real part, obtaining a real part of the received second test signal multiplied by 2 as a second real part, squaring and then averaging the first real part to obtain a third average value, and squaring and then averaging the second real part to obtain a fourth average value; dividing the sum of the first and second average values by the sum of the third and fourth average values to obtain an intermediate parameter; and calculating the calibration parameter based on formula below:

$$\frac{\beta}{\alpha^*} = \frac{\alpha\beta}{0.5 - \text{Re}(\alpha\beta) + \sqrt{0.25 - \text{Re}(\alpha\beta) - \text{Im}^2(\alpha\beta)}}$$

where $\beta/\alpha^*$ represents the calibration parameter, and $\alpha\beta$ represents the intermediate parameter.

Preferably, the calculating a calibration parameter for calibrating a received RF communication signal based on the received first test signal and the received second test signal may further include: removing DC components of the received first and second test signals before obtaining the first and second average values, and removing the DC components of the received first and second test signals, before obtaining the first and second real parts and then obtaining the third and fourth average values.

The signal receiving method may further include: calibrating the RF communication signal received by the receiver based on the calibration parameter, to obtain the calibrated RF communication signal.

Preferably, the calibrating the RF communication signal received by the receiver based on the calibration parameter to obtain the calibrated RF communication signal may include: removing from the RF communication signal the calibration parameter multiplied by a conjugation of the RF communication signal, to obtain the calibrated RF communication signal.

A still further aspect of the present invention provides a signal transmitting method including: transmitting a first test signal, and then transmitting a second test signal after a predefined time period following the completion of the transmission of the first test signal.

The received first test signal and the received second test signal may differ from each other by a phase difference, which is preferably 90°.

The above description is provided for the purpose of better understanding of the present disclosure, but is not intended to limit the present invention in any way. In addition to the illustrative aspects, embodiments and features as described herein with reference to the drawings, additional aspects, embodiments and features would become apparent to those skilled in the art.

BRIEF DESCRIPTION OF THE DRAWINGS

The above and other objects, features and advantages of the illustrative embodiments of the present invention will be apparent from the below detailed description made with reference to the drawings. Unless otherwise specified, the similar reference numerals represent the same or similar parts or elements throughout the drawings. These drawings are not necessarily made in proportion. It should be appreciated that these drawings merely illustrate some embodiments of the present invention and are not intended to limit the scope of the present invention.

DETAILED DESCRIPTION

Figure 1:
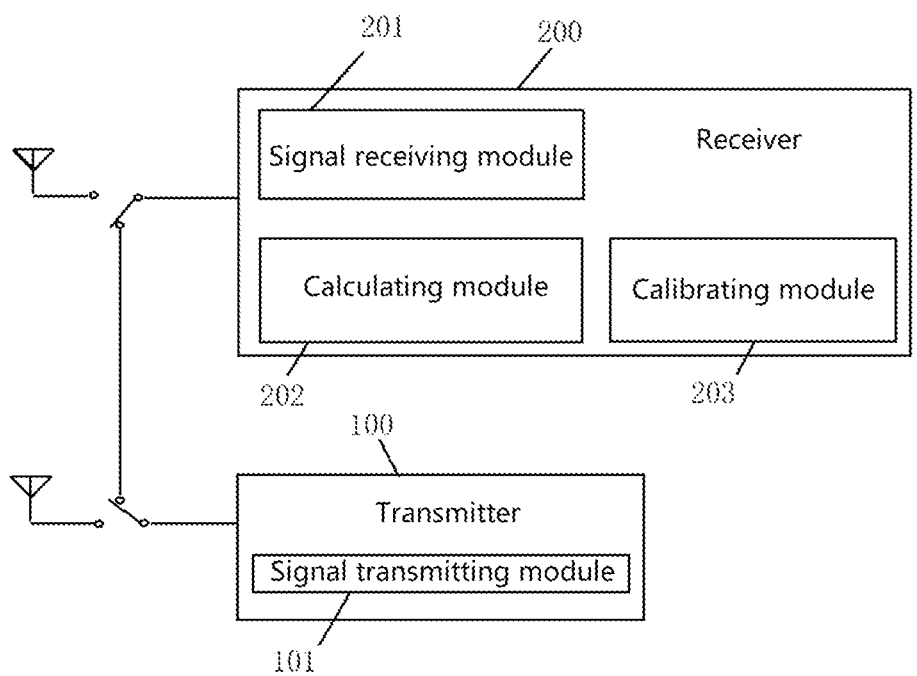
FIG. 1 is a schematic block diagram of a signal transceiver with eliminated mirror interference signals according to an embodiment of the present invention.

In the following description, only some exemplary embodiments are described. As will be appreciated by those skilled in the art, the described embodiments may be modified in various ways without departing from the spirit or scope of the present application. Therefore, the drawings and descriptions are essentially illustrative rather than restrictive.

In the description of the present application, it should be understood that terms such as center, longitudinal, transverse, length, width, thickness, upper, lower, front, rear, left, right, vertical, horizontal, top, bottom, inner, outer, clockwise, counterclockwise, axial, radial, and circumferential indicate an orientation or positional relationship that is based on the orientation or positional relationship shown in the drawings for the sake of the convenient and simplified description of the present application, but do not indicate or imply that the involved device or element necessarily has or operates in the specified orientation, and thus should not be understood as a limitation of the present application.

In addition, the terms "first" and "second" are used for differentiating technical features, but are not intended to indicate or imply the importance of these technical features or implicitly show the number of these technical features. Thus, technical features defined by the terms "first" and "second" may explicitly or implicitly include one or more of the technical features. In the description of the present application, the expression of "a plurality of" means two or more, unless otherwise specifically defined.

In the present application, unless otherwise specified and defined explicitly, the terms "arranged", "coupled", "connected", "fixed" and the like should be understood in a broad sense, and may refer to, for example, a fixed or detachable connection or being integrated, a mechanical, electrical or communication connection, a direct connection or an indirect connection through an intermediate medium, or a connection between two elements or the interaction between two elements. The specific meanings of the above terms in the present application may be understood by those skilled in the art depending on the specific context.

In the present application, unless otherwise specified and defined explicitly, a first feature being "above" or "below" a second feature includes that the first feature is in direct contact with the second feature, or that the first and second features are in contact with each other indirectly via an additional feature therebetween. Moreover, the first feature being "above", "over" or "on" the second feature may include that the first feature is right above or inclinedly above the second feature, or simply that the first feature is higher in level than the second feature. Likewise, the first feature being "below" or "under" the second feature may include that the first feature is right below or inclinedly below the second feature, or simply that the first feature is lower in level than the second feature.

The following disclosure provides various embodiments or examples for illustrating the implementation of various structures of the present disclosure. In order to simplify the disclosure of the present application, components and arrangements of specific examples are described below. Of course, these examples are merely illustrative, but not intended to limit the present invention. In addition, the same reference numerals may be used throughout different examples for the sake of simplification and clarity, but do not necessarily mean any relationship between the various embodiments or examples.

Typically, an RF signal $S_{RF}(t)$ received by a receiver during communication may be represented by the below complex function of Formula (1) in the complex field (i.e. the I/Q plane).

$$s_{RF}(t) = s(t)e^{j2\pi(f_0 + f_{IF})t} + s^*(t)e^{-j2\pi(f_0 + f_{IF})t} \quad (1)$$

In the above Formula (1), s(t) represents a complex baseband signal, $f_0$ represents the frequency of a local oscillator (LO), and $f_{IF}$ represents the frequency of an intermediate frequency (IF) signal.

Correspondingly, a mirror interference signal $i_{RF}(t)$ that would cause an interference may be represented by Formula (2) below.

$$i_{RF}(t)=i(t)e^{j2\pi(f_0-f_{IF})t}+i^*(t)e^{-j2\pi(f_0-f_{IF})t} \quad (2)$$

An analog LO signal $x_{LO}(t)$ affected by the mismatch between the I mixer and the Q mixer of the RF receiver may be represented by Formula (3) below.

$$x_{LO}(t) = \cos 2\pi f_0 t - jg\sin(2\pi f_0 t + \theta) = \quad (3)$$
$$\frac{1}{2}(e^{j2\pi f_0 t} + e^{-j2\pi f_0 t}) - \frac{1}{2}(e^{j(2\pi f_0 t+\theta)} - e^{-j(2\pi f_0 t+\theta)})g$$

In the above Formula (3), g represents amplitude mismatch between the I mixer and the Q mixer, and $\theta$ represents phase mismatch between the I mixer and the Q mixer. An Intermediate Frequency (IF) signal $r_{IF}(t)$ obtained after the mixing and low-pass filtering may be represented by Formula (4) below.

$$r_{IF}(t) = \frac{1}{2}s(t)e^{j2\pi f_{IF}t}[1+e^{-j\theta}g] + \frac{1}{2}s^*(t)e^{-j2\pi f_{IF}t}[1-e^{j\theta}g] + \quad (4)$$
$$\frac{1}{2}i(t)e^{-j2\pi f_{IF}t}[1+e^{-j\theta}g] + \frac{1}{2}i^*(t)e^{j2\pi f_{IF}t}[1-e^{j\theta}g]$$

Given definitions of Formulas (5) and (6) below, $$\alpha = \frac{1}{2}[1+e^{-j\theta}g] \quad (5)$$

$$\beta = \frac{1}{2}[1-e^{-j\theta}g] \quad (6)$$

Formula (4) may be given as $$r_{IF}(t) = \alpha s(t)e^{j2\pi f_{IF}t} + \beta s^*(t)e^{-j2\pi f_{IF}t} + \alpha i(t)e^{-j2\pi f_{IF}t} + \beta i^*(t)e^{j2\pi f_{IF}t} = \quad (7)$$
$$\alpha[s(t)e^{j2\pi f_{IF}t} + i(t)e^{-j2\pi f_{IF}t}] + \beta[s^*(t)e^{-j2\pi f_{IF}t} + i^*(t)e^{j2\pi f_{IF}t}] =$$
$$\alpha[s_{IF}(t) + i_{IF}(t)] + \beta[s^*_{IF}(t) + i^*_{IF}(t)]$$

The IF signal $r_{IF}(t)$ may be then converted by an Analog-to-Digital convertor into a digital signal, which is then converted into a baseband signal through digital mixing and digital low-pass filtering, and the baseband signal may be represented by Formula (8) below.

$$r_{BB}(n)=\alpha s(n)+\beta i^*(n) \quad (8)$$

In the above formula, $\beta i^*(n)$ represents a mirror interference signal caused by the mismatch between the I mixer and the Q mixer of the RF receiver. If a zero IF technology is employed at the receiver, the obtained baseband signal may be represented by Formula (9) below.

$$r_{BB}(n)=\alpha s(n)+\beta s^*(n) \quad (9)$$

That is to say, in the case of a zero IF receiver, the mirror interference signal caused by the mismatch between the I mixer and the Q mixer of the RF receiver to a received signal is equal to the conjugate of the received signal that is multiplied by $\beta$. Regardless of the employed low-IF receiver or zero IF receiver, the mirror interference signal caused by the mismatch between the I mixer and the Q mixer of the RF receiver may be eliminated through calibration operations indicated by Formula (10) below.

$$r_{ca}(n) = r_{BB}(n) - \frac{\beta}{\alpha^*}r^*_{BB}(n) \quad (10)$$

In order to estimate a calibration parameter $\beta/\alpha^*$, a complex single-tone baseband test signal b(n) represented by Formula (11) below needs to be transmitted from an RF transmitter to the RF receiver.

$$b(n) = e^{-j\frac{2\pi f_b n}{f_s}} \quad (11)$$

In the above formula, $f_b$ represents the frequency of the complex single-tone baseband test signal transmitted by the RF transmitter, and $f_s$ represents a sampling frequency applied to the single-tone baseband test signal by the RF receiver. Thus, an RF single-tone test signal b(t) represented by Formula (12) below may be obtained after the mixing by the I and Q mixers of the RF transmitter.

$$b(t)=\cos[2\pi(f_0+f_b)t] \quad (12)$$

As can be seen from the above formulas, because the amplitude and phase of the RF single-tone test signal would not affect the estimating of $\beta/\alpha^*$, the amplitude and phase of the RF single-frequency test signal b(t) are assumed to be 1 and 0°, respectively, for the sake of simplification. Meanwhile, because a residual error exists in the RF transmitter after the calibration for the RF transmitter, an RF single-tone interference signal q(t) in addition to the RF single-frequency test signal b(t) is present at the transmitter and may be given by Formula (13) below.

$$q(t)=A_q \cos[2\pi(f_0-f_b)t+\phi] \quad (13)$$

In Formula (13), the amplitude $A_q$ of the interference signal q(t) caused by the residual error is a constant of a very small value but is not equal to 0, and the phase $\phi$ of the interference signal q(t) has no impact on the estimation of $\beta/\alpha^*$.

When the test signal b(t) is transmitted to the RF receiver together with the interference signal q(t), the obtained baseband signal at the RF receiver may be represented by Formula (14) below.

$$r(n) = \alpha\left[e^{j\frac{2\pi f_b n}{f_s}} + A_q e^{j\phi}e^{-j\frac{2\pi f_b n}{f_s}}\right] + \beta\left[e^{-j\frac{2\pi f_b n}{f_s}} + A_q e^{-j\phi}e^{j\frac{2\pi f_b n}{f_s}}\right] \quad (14)$$

Then, if the baseband signal r(n) is squared, the average of the squared baseband signal, i.e. a direct current component of the squared baseband signal, may be represented as Formula (15) below.

$$\overline{r^2(n)}=2\alpha^2 A_q e^{j\phi}+2\beta^2 A_q e^{-j\phi}+2\alpha\beta(1+A_q^2) \quad (15)$$

Meanwhile, if the real part of 2r(n) is squared, the average of the squared real part of 2r(n) may be represented by Formula (16) below.

$$\overline{[\text{real}(2r(n))]^2} = \overline{[r(n)+r^*(n)]^2} = \overline{\left\{(\alpha+\beta^*)\left[e^{j\frac{2\pi f_b n}{f_s}}+A_q e^{j\phi}e^{-j\frac{2\pi f_b n}{f_s}}\right]+ \right.} \quad (16)$$
$$\overline{\left.(\alpha^*+\beta)\left[e^{-j\frac{2\pi f_b n}{f_s}}+A_q e^{-j\phi}e^{j\frac{2\pi f_b n}{f_s}}\right]\right\}^2}$$

According to Formulas (5) and (6), the below Formula (7) may be given.

$$\alpha+\beta^*=\alpha^*+\beta=1 \quad (17)$$

Given the above, Formula (16) may be simplified as:

$$\overline{[\text{real}(2r(n))]^2} = \quad (18)$$
$$\overline{\left\{\left[e^{j\frac{2\pi f_b n}{f_s}}+A_q e^{j\phi}e^{-j\frac{2\pi f_b n}{f_s}}\right]+\left[e^{-j\frac{2\pi f_b n}{f_s}}+A_q e^{-j\phi}e^{j\frac{2\pi f_b n}{f_s}}\right]\right\}^2} =$$
$$2A_q(e^{j\phi}+e^{-j\phi})+2(1+A_q^2)$$

If $A_q=0$, then Formulas (15) and (18) may be simplified as below:

$$\overline{r^2(n)}=2\alpha\beta \quad (19)$$

$$\overline{[\text{real}\{2r(n)\}]^2}=2 \quad (20)$$

Therefore, an intermediate parameter $\alpha\beta$ can be obtained as below.

$$\alpha\beta = \frac{\overline{r^2(n)}}{\overline{[\text{real}(2r(n))]^2}} \quad (21)$$

Finally, the value of the calibration parameter $\beta/\alpha^*$ can be obtained by Formula (22) below.

$$\frac{\beta}{\alpha^*} = \frac{\alpha\beta}{\alpha\alpha^*} = \frac{\alpha\beta}{(1+g^2+2g\cos\theta)/4} = \quad (22)$$
$$\frac{\alpha\beta}{0.5-\text{Re}(\alpha\beta)+\sqrt{0.25-\text{Re}(\alpha\beta)-\text{Im}^2(\alpha\beta)}}$$

However, because $A_q$ is not equal to 0, the intermediate parameter $\alpha\beta$ obtained by Formula (21) is of a limited precision and the precision of estimating the calibration parameter $\beta/\alpha^*$ cannot be improved, and hence the calibration operation for eliminating the mirror interference signal caused by the mismatch between the I mixer and the Q mixer at the RF receiver based on Formula (10) can hardly satisfy the high calibration precision as required by some application scenarios demanding for high calibration standards.

In view of the above, the present disclosure proposes a novel method for improving the precision of the calculated intermediate parameter $\alpha\beta$ based on digital signal processing technologies, so that the precision of calculating the intermediate parameter $\alpha\beta$ will not be lowered even if $A_q$ is not equal to 0. In addition to generating and transmitting the above-mentioned test signal b(n), the subject method further includes generating and transmitting another complex single-tone baseband test signal $b_a(n)$ as represented by Formula (23) below.

$$b_a(n) = e^{j\left(\frac{2\pi f_b n}{f_z}-\frac{\pi}{2}\right)} \quad (23)$$

In some embodiments, the another complex single-tone baseband test signal $b_a(n)$ has a phase difference from the test signal b(n), and such phase difference may be, for example, either 90° or −90°. Hereinafter, the description is made by an example where the phase difference is −90°. After the complex single-tone baseband test signal $b_a(n)$ passes through the I and Q mixers at the RF transmitter, an RF single-tone test signal $b_a(t)$ as presented by Formula (24) below is obtained.

$$b_a(t) = \cos\left[2\pi(f_0+f_b)t-\frac{\pi}{2}\right] \quad (24)$$

Meanwhile, because a residual error exists at the RF transmitter after calibration, an RF single-tone interference signal $q_a(t)$ will be obtained as below.

$$q_a(t) = A_q \cos\left[\frac{2\pi(f_0+f_b)n}{f_s}-\frac{\pi}{2}+\phi\right] \quad (25)$$

When the test signal $b_a(t)$ is transmitted to the RF receiver together with the interference signal $q_a(t)$, a baseband signal $r_a(n)$ represented by Formula (26) below may be obtained according to Formula (8).

$$r_a(n) = \alpha\left[e^{-j\frac{\pi}{2}}e^{j\frac{2\pi f_b n}{f_s}}+A_q e^{j\left(-\frac{\pi}{2}+\phi\right)}e^{-j\frac{2\pi f_b n}{f_s}}\right]+ \quad (26)$$
$$\beta\left[e^{j\frac{\pi}{2}}e^{-j\frac{2\pi f_b n}{f_s}}+A_q e^{-j\left(-\frac{\pi}{2}+\phi\right)}e^{j\frac{2\pi f_b n}{f_s}}\right]$$

Then, if the baseband signal $r_a(n)$ is squared, the average of the squared baseband signal may be represented as Formula (27) below.

$$\overline{r_a^2(n)}=-2\alpha^2 A_q e^{j\phi}-2\beta^2 A_q e^{-j\phi}+2\alpha\beta(1+A_q^2) \quad (27)$$

Meanwhile, if the real part of $2r_a(n)$ is squared, then the average of the squared real part of $2r_a(n)$ may be represented by Formula (28) below.

$$\overline{[\text{real}\{2r_a(n)\}]^2} = \overline{[r_a(n)+r_a^*(n)]^2} \quad (28)$$
$$= \overline{\left\{\left[e^{-j\frac{\pi}{2}}e^{j\frac{2\pi f_b n}{f_s}}+A_q e^{j\left(-\frac{\pi}{2}+\phi\right)}e^{-j\frac{2\pi f_b n}{f_s}}\right]+\right.}$$
$$\overline{\left.\left[e^{j\frac{\pi}{2}}e^{-j\frac{2\pi f_b n}{f_s}}+A_q e^{-j\left(-\frac{\pi}{2}+\phi\right)}e^{j\frac{2\pi f_b n}{f_s}}\right]\right\}^2}$$
$$= -2A_q(e^{j\phi}+e^{-j\phi})+2(1+A_q^2)$$

Formula (29) below may be derived from the above Formulas (15) and (27) as:

$$\overline{r^2(n)}+\overline{r_a^2(n)}=4\alpha\beta(1+A_q^2) \quad (29)$$

Further, Formula (30) below may be derived from the above Formulas (18) and (28) as:

$$\overline{[\text{real}\{2r(n)\}]^2}+\overline{[\text{real}\{2r_a(n)\}]^2}=4(1+A_q^2) \quad (30)$$

Thus, the value of the intermediate parameter $\alpha\beta$ can be precisely calculated by the following Formula (31), that is to say, even if $A_q$ is not equal to 0, the precision of calculating $\alpha\beta$ will not decrease.

$$\alpha\beta = \frac{\overline{r^2(n)} + \overline{r_a^2(n)}}{\overline{[\text{real}(2r(n))]^2} + \overline{[\text{real}(2r_a(n))]^2}} \quad (31)$$

The above description presents the principles of the solution of eliminating the mirror interference signal according to the present disclosure.

According to an embodiment of the present invention, a signal transceiver with eliminated mirror interference signals is provided. FIG. 1 shows a schematic block diagram of the signal transceiver. As shown in FIG. 1, the signal transceiver includes an RF transmitter 100 and an RF receiver 200, and the transmitter 100 may connected to the receiver 200 via a switch so that the receiver 200 can receive test signals from the transmitter 100, when the switch is closed during the calibration operation.

The transmitter 100 includes a signal transmitting module 101, which is configured to transmit a first test signal, and then transmit a second test signal after a predefined time period following the completion of the transmission of the first test signal. In some implementations, there is a phase difference, which is preferably of 90°, between the first test signal and the second test signal.

The receiver 200 includes a signal receiving module 201, which is configured to receive a first test signal, and receive a second test signal after the predefined time period following the completion of the reception of the first test signal. In some implementations, there is a phase difference, which is preferably of 90°, between the first test signal and the second test signal.

The receiver 200 may further include a calculating module 202, which is configured to calculate a calibration parameter for calibrating the received RF communication signal, based on the received first test signal and the received second test signal. In some implementations, the calculating module 202 may be used to: square and then average the received first test signal to obtain a first average value, and square and then average the received second test signal to obtain a second average value; obtain a real part of the received first test signal multiplied by 2 as a first real part, obtain a real part of the received second test signal multiplied by 2 as a second real part, square and then average the first real part to obtain a third average value, and square and then average the second real part to obtain a fourth average value; divide the sum of the first and second average values by the sum of the third and fourth average values to obtain an intermediate parameter; and calculate a calibration parameter based on the above Formula (22). In some implementations, the calculating module 202 may be further used to: remove DC components of the received first and second test signals before obtaining the first and second average values, and remove the DC components of the received first and second test signals before obtaining the first and second real parts and then obtaining the third and fourth average values.

The receiver 200 may further include a calibrating module 203, which is configured to calibrate the RF communication signal received by the receiver 200 based on the calibration parameter, to obtain the calibrated RF communication signal. Particularly, by removing the calibration parameter multiplied by the conjugation of the RF communication signal from the RF communication signal, the calibrating module 203 may obtain the calibrated RF communication signal.

Figure 2:
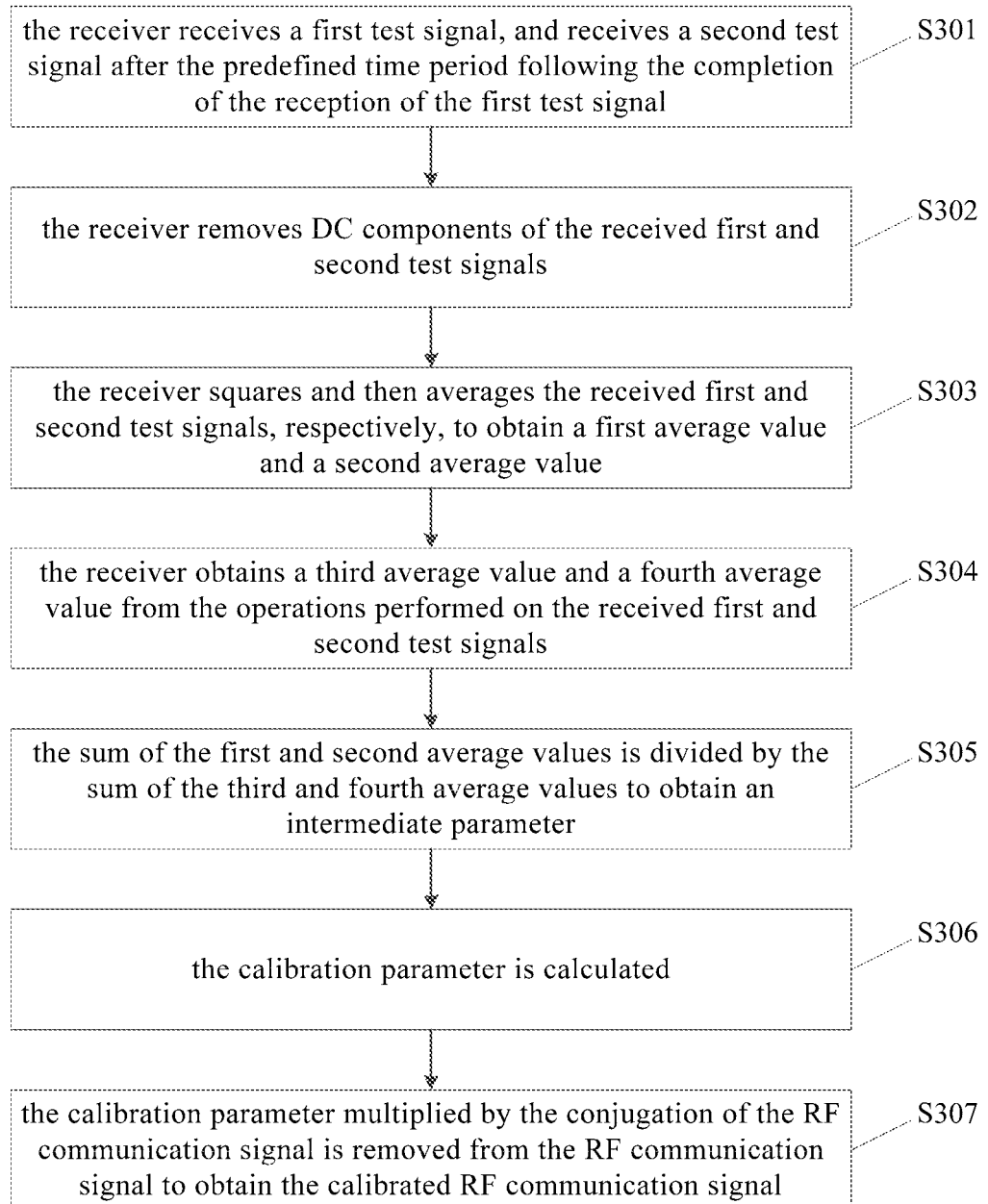
FIG. 2 is a schematic flow diagram of a signal receiving method carried out at an RF receiver according to an embodiment of the present invention.

FIG. 2 shows a schematic flow diagram of a signal receiving method carried out at the RF receiver according to an embodiment of the present invention. As shown in FIG. 2, the signal receiving method includes the following steps of:

Step S301 in which the signal receiving module of the receiver 200 receives a first test signal, and receives a second test signal after the predefined time period following the completion of the reception of the first test signal;

Step S302 in which the calculating module 202 removes DC components of the received first and second test signals;

Step S303 in which the calculating module 202 squares and then averages the received first test signal to obtain a first average value, and squares and then averages the received second test signal to obtain a second average value;

Step S304 in which the calculating module 202 obtains a real part of the received first test signal multiplied by 2 as a first real part, obtains a real part of the received second test signal multiplied by 2 as a second real part, squares and then averages the first real part to obtain a third average value, and squares and then averages the second real part to obtain a fourth average value;

Step S305 in which the calculating module 202 divides the sum of the first and second average values by the sum of the third and fourth average values to obtain an intermediate parameter $\alpha\beta$;

Step S306 in which the calculating module 202 calculates the calibration parameter $\alpha/\beta^*$ based on the above Formula (22); and Step S307 in which the calibrating module 203 removes the calibration parameter $\alpha/\beta^*$ multiplied by the conjugation of the RF communication signal from the RF communication signal, to obtain the calibrated RF communication signal.

Figure 3:
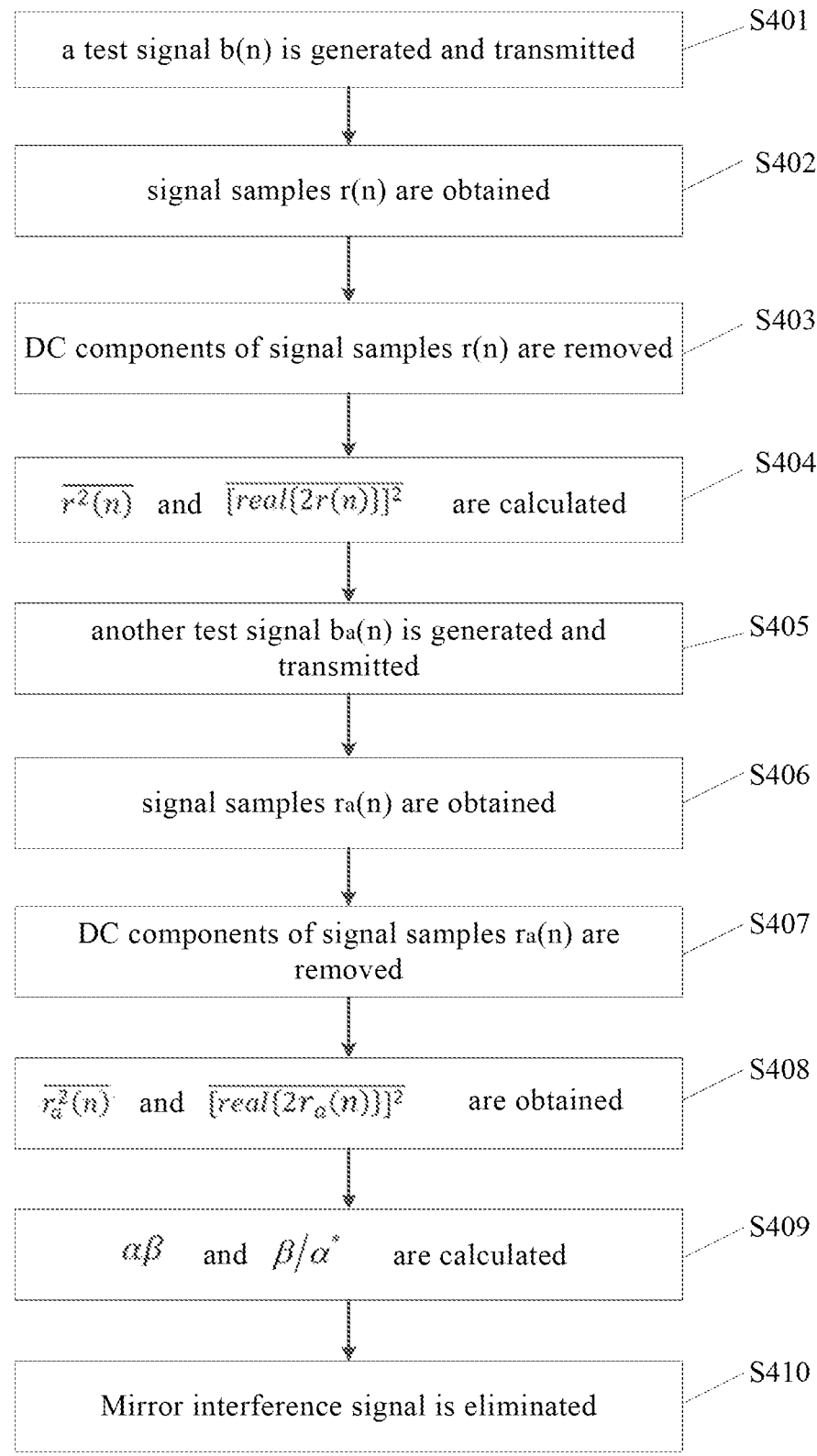
FIG. 3 is a schematic overall flow diagram of a method for eliminating mirror interference signals according to an embodiment of the present invention.

FIG. 3 is a schematic overall flow diagram of a method for eliminating mirror interference signals according to an embodiment of the present invention, and the method includes the following Steps S401 to S410.

At Step S401, the RF transmitter generates a complex single-tone baseband test signal b(n) represented by $$b(n) = e^{j2\pi f_b n / f_s},$$

and transmits the complex single-tone baseband test signal b(n) to the RF receiver starting from a time point t=0.

At Step S402, when the test signal received by the RF receiver is stabilized, the RF receiver samples the received test signal b(n) starting from a time point t=$\tau_1$, to obtain KN signal samples r(n) of the received test signal b(n), here N=$f_s/f_b$, and K is a positive integer. If the value of K is increased, the RF receiver gets more resistant to random noise, but is subjected to longer calibration time. In some embodiment, K may be of a value from 1 to 100, and preferably from 1 to 10.

At Step S403, the RF receiver eliminates a DC component from the signal samples r(n) that is caused by nonideal factors of the RF receiver, according to Formula (32) below.

$$r(n) = r(n) - \frac{1}{KN}\sum_{n=1}^{KN} r(n) \quad (32)$$

At Step S404, for the signal samples r(n) with the eliminated DC component, the RF receiver calculates the values of $\overline{r^2(n)}$ and $\overline{[real\{2r(n)\}]^2}$ as below:

$$\overline{r^2(n)} = \frac{1}{KN}\sum_{n=1}^{KN} r^2(n) \quad (33)$$

$$\overline{[real\{2r(n)\}]^2} = \frac{1}{KN}\sum_{n=1}^{KN} [real\{2r(n)\}]^2 \quad (34)$$

At Step S405, the RF transmitter may generate another test signal $$b_a(n) = e^{j\left(\frac{2\pi f_b n}{f_s} - \frac{\pi}{2}\right)},$$

and transmit the test signal $b_a(n)$ to the RF receiver starting from a time point $t=\tau_1+KNT_s$.

At Step S406, when the another test signal received by the RF receiver is stabilized, the RF receiver samples the received test signal $b_a(n)$ starting from a time point $t=2\tau_1+KNT_s$, to obtain KN signal samples $r_a(n)$ of the received test signal $b_a(n)$.

At Step S407, the RF receiver eliminates a DC component from the signal samples $r_a(n)$ that is caused by the nonideal factors of the RF receiver, according to Formula (35) below.

$$r_a(n) = r_a(n) - \frac{1}{KN}\sum_{n=1}^{KN} r_a(n) \quad (35)$$

At Step S408, for the signal samples $r_a(n)$ with the eliminated DC component, the RF receiver calculates the values of $\overline{r_a^2(n)}$ and $\overline{[real\{2r_a(n)\}]^2}$ as below:

$$\overline{r_a^2(n)} = \frac{1}{KN}\sum_{n=1}^{KN} r_a^2(n) \quad (36)$$

$$\overline{[real\{2r_a(n)\}]^2} = \frac{1}{KN}\sum_{n=1}^{KN} [real\{2r_a(n)\}]^2 \quad (37)$$

At Step S409, the RF receiver calculates the value of the intermediate parameter $\alpha\beta$ based on Formula (31) and calculates the value of the calibration parameter $\beta/\alpha^*$ based on Formula (22).

At Step S410, the RF receiver carries out calibration operations according to Formula (10) to eliminate the mirror interference signal caused by the mismatch between the I mixer and the Q mixer at the RF receiver.

Correspondingly, the present disclosure further provides a signal transceiver with the eliminated mirror interference signal, and the signal transceiver includes various modules/components configured to perform the various steps of the method for eliminating the mirror interference signal. The signal transceiver can transmit sequentially various test signals from its RF transmitter end, these test signals are of the same amplitude but different phases, and these phases are of a certain relationship, for example, the phase of the test signal b(n) differs from the phase of the test signal $b_a(n)$ by 90°.

The signal transceiver may further combine results of processing the various test signals at the RF receiver end, according to certain mathematic operations (for example, results of processing the various test signals are added), in order for the effects of precisely estimating the mismatched parameters of the I and Q mixers (e.g. the mismatched amplitude and the mismatched phase) and eliminating the interference signal in the test signals, so that the mirror interference signal caused by the mismatch between the I mixer and the Q mixer at the RF receiver can be eliminated with even higher precision.

The technical solutions of the present disclosure can eliminate the mirror interference signal caused by the mismatch between the I mixer and the Q mixer with high precision, without changing or significantly changing the structures of the RF transmitter and the RF receiver. Compared with the traditional methods for eliminating mirror interference signals, the method provided by the present disclosure can improve the precision of eliminating the mirror interference signals by at least one order of magnitude. For example, with the calibration by the solutions of the present disclosure, the amplitude mismatch can be limited to ±0.2% or better of the ideal amplitude, and the phase mismatch can be limited to ±0.2 degree or better.

As desired, the system, method and apparatus in the embodiments of the present invention can be implemented by merely software such as a software programmed by Java, by merely hardware such as dedicated ASIC or FPGA chips, or by a combination of software and hardware such as a firmware system stored with codes or a system including a universal storage and a processor.

Further, although the operations of the method of the present disclosure are illustrated in certain steps, it is not required or implied that these operations are necessarily performed in such steps or the desired result can be obtained only if all these operations are performed. Additionally or alternatively, some of these steps may be omitted, or several of these steps may be combined into one step, or one of these steps may be divided into several sub-steps for execution.

It is noted that although the above detailed description is given in examples in which the methods are implemented by some devices or modules and sub-devices or sub-modules, such division into these devices or modules and sub-devices or sub-modules is not compulsory. Actually, features and functions of two or more devices described as above according to the embodiments of the present invention can be alternatively embodied in one device or module. On the contrary, features and functions of one of the devices described as above according to the embodiments of the present invention can be alternatively embodied in multiple devices or modules.

The above description illustrates merely some specific implementation of the present disclosure, but is not intended to limit the scope of protection of the present invention, and any variation or replacement readily occurring to those skilled in the art within the technical scope disclosed by the present invention should be covered by the protection scope of the present invention. Therefore, the protection scope of the present invention should be subject to the protection scope of the claims.

What is claimed is:
1. A receiver, comprising:
a signal receiving module (201), which is configured to receive a first test signal, and receive a second test signal after a predefined time period following the completion of the reception of the first test signal, and a calculating module (202), which is configured to calculate a calibration parameter for calibrating a received RF communication signal, based on the received first test signal and the received second test signal, wherein the calculating module (202) is further configured to:

square and then average the received first test signal to obtain a first average value, and square and then average the received second test signal to obtain a second average value;

obtain a real part of the received first test signal multiplied by 2 as a first real part, obtain a real part of the received second test signal multiplied by 2 as a second real part, square and then average the first real part to obtain a third average value, and square and then average the second real part to obtain a fourth average value;

divide the sum of the first and second average values by the sum of the third and fourth average values to obtain an intermediate parameter; and calculate the calibration parameter based on formula below:

$$\frac{\beta}{\alpha^*} = \frac{\alpha\beta}{0.5 - \text{Re}(\alpha\beta) + \sqrt{0.25 - \text{Re}(\alpha\beta) - \text{Im}^2(\alpha\beta)}}$$

wherein $\beta/\alpha^*$ represents the calibration parameter, and $\alpha\beta$ represents the intermediate parameter.

2. The receiver of claim 1, wherein the calculating module (202) is further configured to:

remove DC components of the received first and second test signals before obtaining the first and second average values, and remove the DC components of the received first and second test signals, before obtaining the first and second real parts and then obtaining the third and fourth average values.

3. The receiver of claim 1, further comprising a calibrating module (203), which is configured to calibrate the RF communication signal received by the receiver based on the calibration parameter, to obtain the calibrated RF communication signal.

4. The receiver of claim 3, wherein the calibrating module (203) is configured to remove from the RF communication signal the calibration parameter multiplied by the conjugation of the RF communication signal, to obtain the calibrated RF communication signal.

5. The receiver of claim 1, wherein the received first test signal and the received second test signal differ by a phase difference, which is preferably 90°.

6. A signal transceiver, comprising a receiver of claim 1 and a transmitter, wherein the transmitter comprises a signal transmitting module, which is configured to transmit a first test signal, and then transmit a second test signal after a predefined time period following the completion of the transmission of the first test signal, the receiver and the transmitter are connected via a switch, and when the switch is closed, the first test signal transmitted from the transmitter is received by the receiver as the received first test signal, and the second test signal transmitted from the transmitter is received by the receiver as the received second test signal.

7. A signal receiving method, comprising:

receiving, by a receiver, a first test signal, and receiving a second test signal after a predefined time period following the completion of the reception of the first test signal; and calculating a calibration parameter for calibrating a received RF communication signal, based on the received first test signal and the received second test signal, wherein the calculating a calibration parameter for calibrating a received RF communication signal based on the received first test signal and the received second test signal comprises:

squaring and then averaging the received first test signal to obtain a first average value, and squaring and then averaging the received second test signal to obtain a second average value;

obtaining a real part of the received first test signal multiplied by 2 as a first real part, obtaining a real part of the received second test signal multiplied by 2 as a second real part, squaring and then averaging the first real part to obtain a third average value, and squaring and then averaging the second real part to obtain a fourth average value;

dividing the sum of the first and second average values by the sum of the third and fourth average values to obtain an intermediate parameter; and calculating the calibration parameter based on formula below:

$$\frac{\beta}{\alpha^*} = \frac{\alpha\beta}{0.5 - \text{Re}(\alpha\beta) + \sqrt{0.25 - \text{Re}(\alpha\beta) - \text{Im}^2(\alpha\beta)}}$$

wherein $\beta/\alpha^*$ represents the calibration parameter, and $\alpha\beta$ represents the intermediate parameter.

8. The method of claim 7, wherein the calculating a calibration parameter for calibrating a received RF communication signal based on the received first test signal and the received second test signal further comprises:

removing DC components of the received first and second test signals before obtaining the first and second average values, and removing the DC components of the received first and second test signals, before obtaining the first and second real parts and then obtaining the third and fourth average values.

9. The method of claim 7, further comprising:

calibrating the RF communication signal received by the receiver based on the calibration parameter, to obtain the calibrated RF communication signal.

10. The method of claim 9, wherein the calibrating the RF communication signal received by the receiver based on the calibration parameter to obtain the calibrated RF communication signal comprises:

removing from the RF communication signal the calibration parameter multiplied by a conjugation of the RF communication signal, to obtain the calibrated RF communication signal.

11. The method of claim 7, wherein the received first test signal and the received second test signal differ by a phase difference, which is preferably 90°.

* * * * *